O. C. EDWARDS, Jr.
CAISSON.
APPLICATION FILED MAY 29, 1908.
1,023,825.
Patented Apr. 23, 1912.
7 SHEETS—SHEET 2.
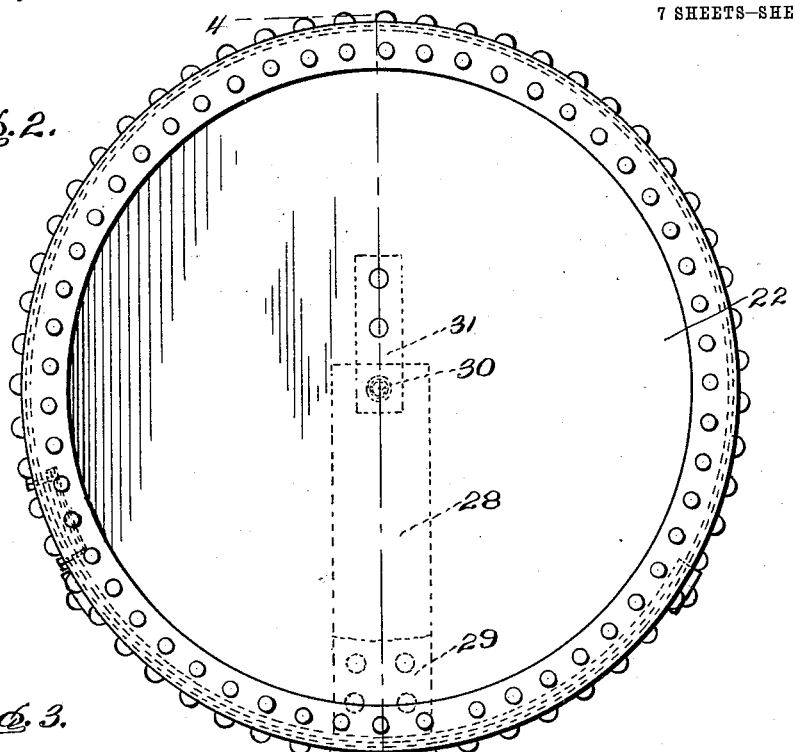
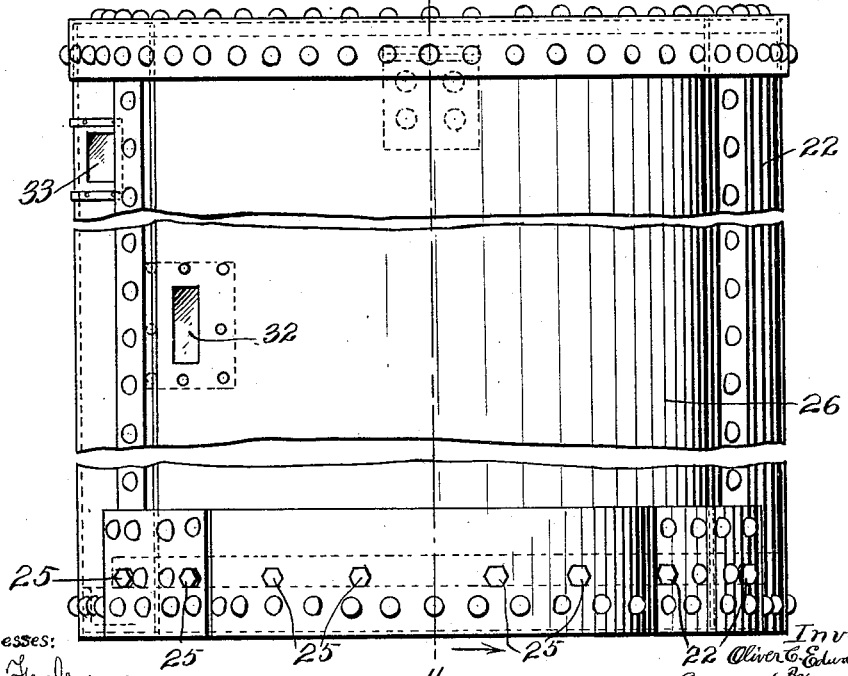
Witnesses:
Inventor
Oliver C. Edwards, Jr.
By Edgar M. Kitchin
his Attorney.

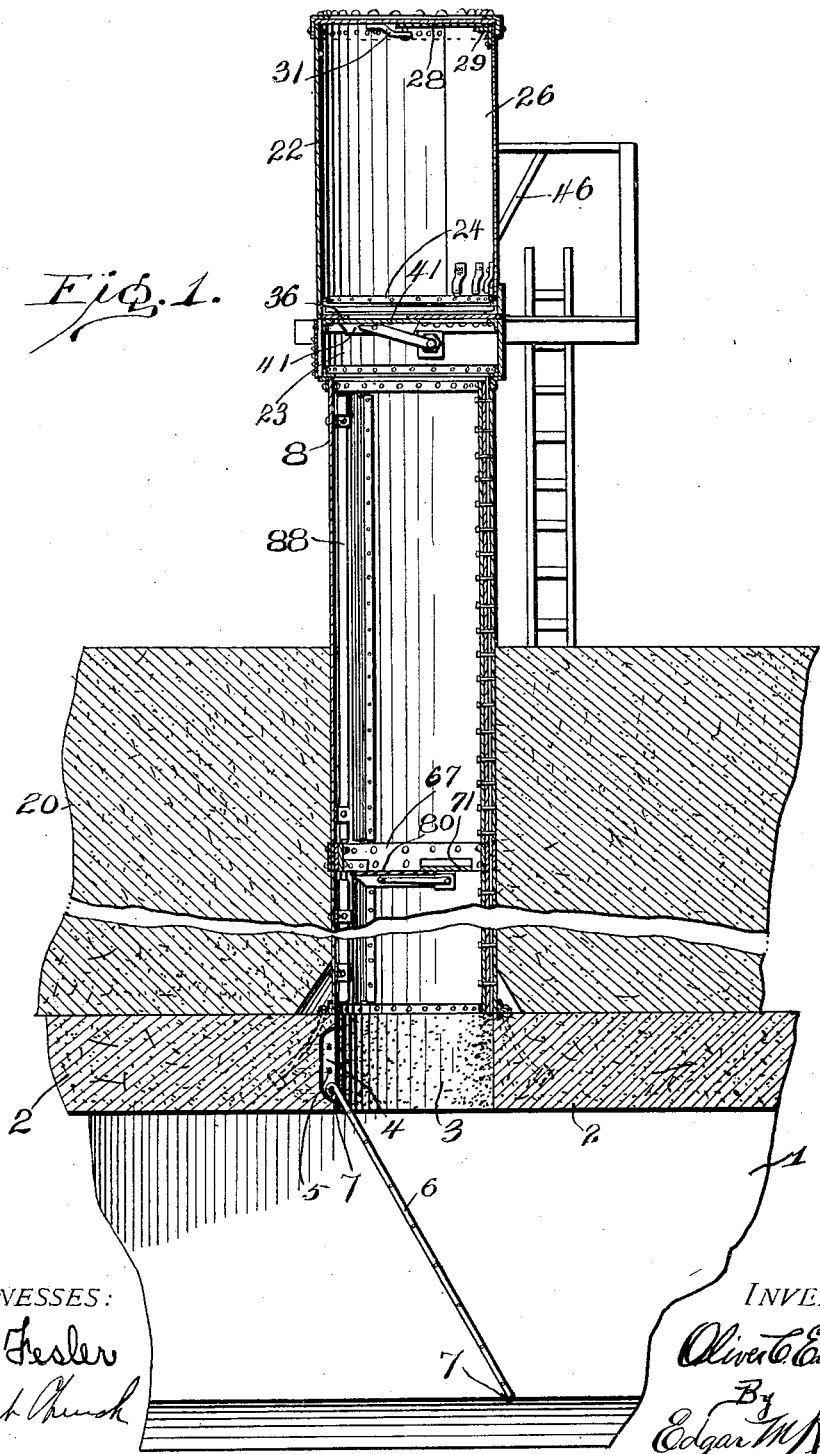

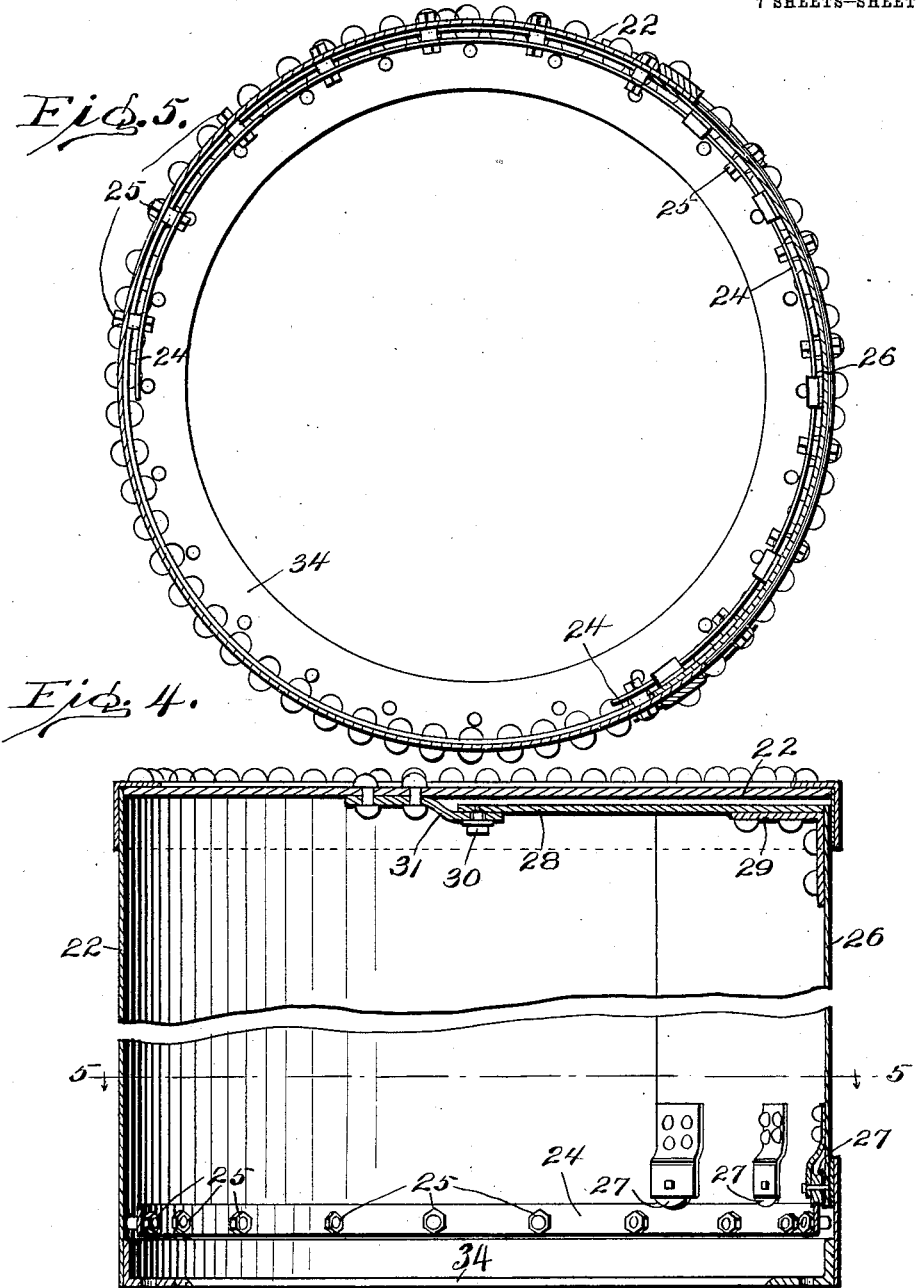

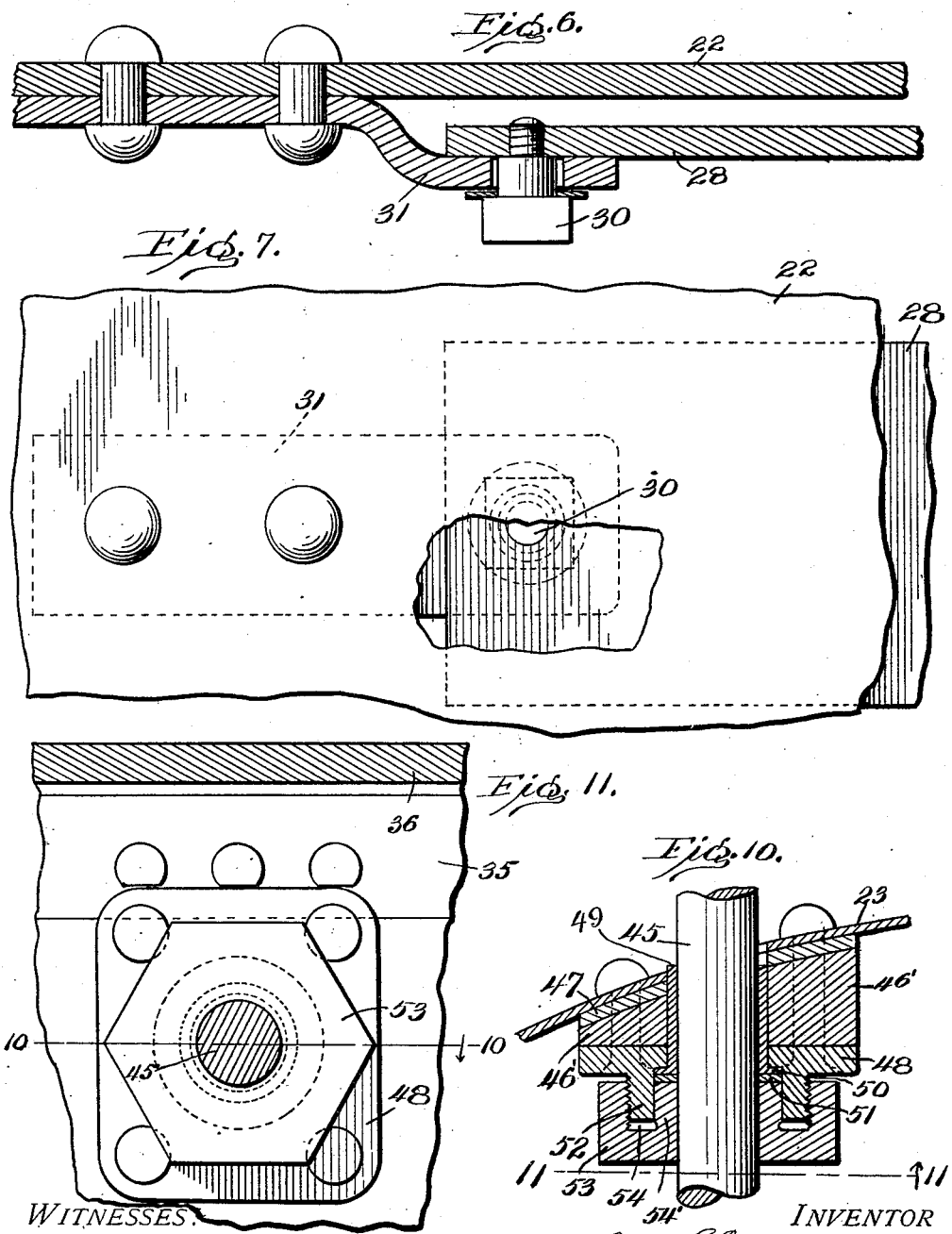

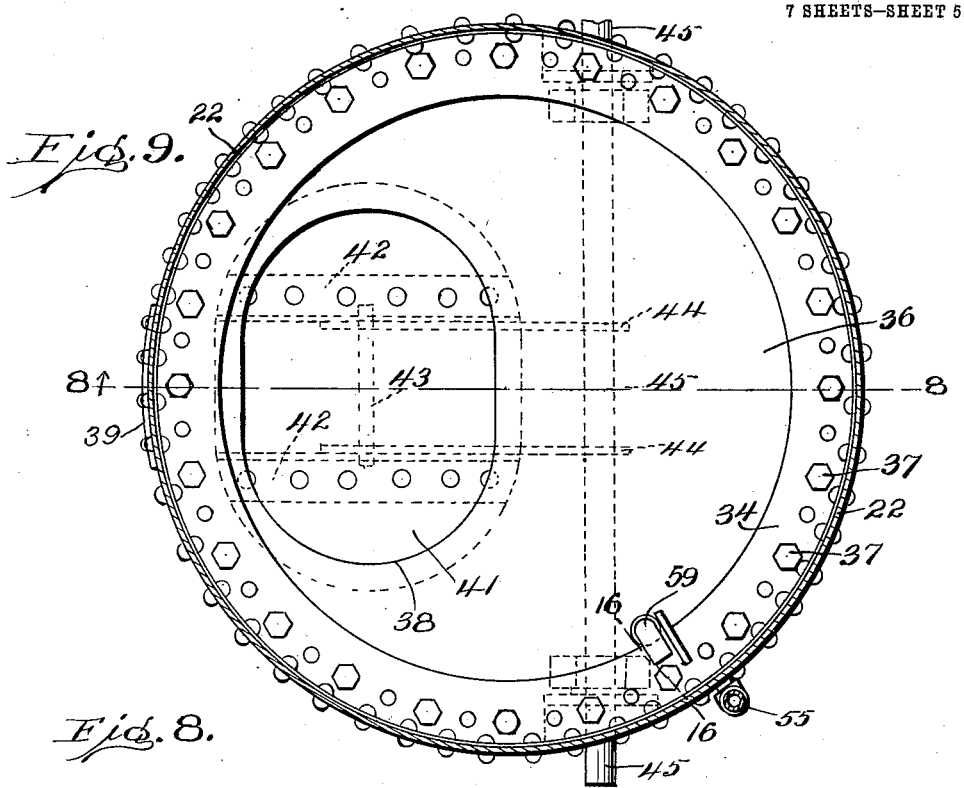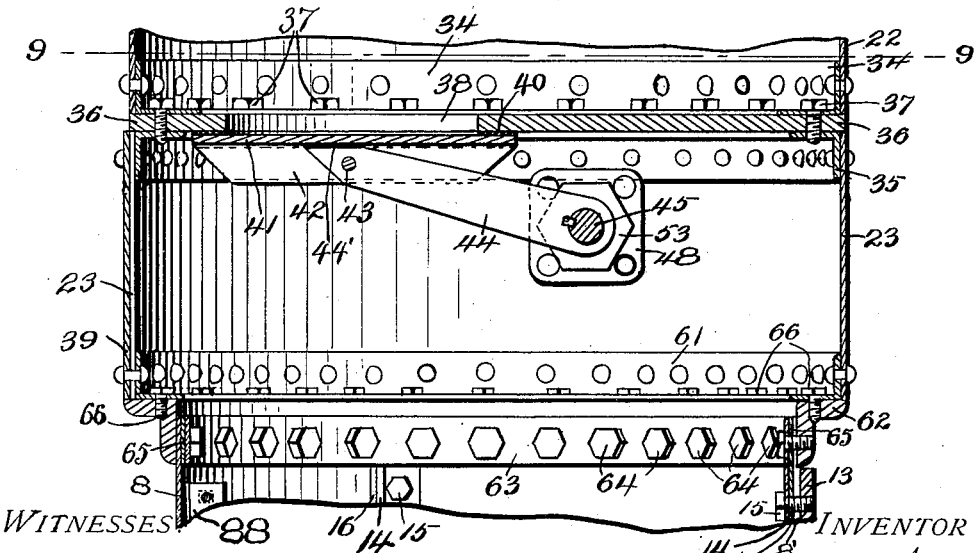

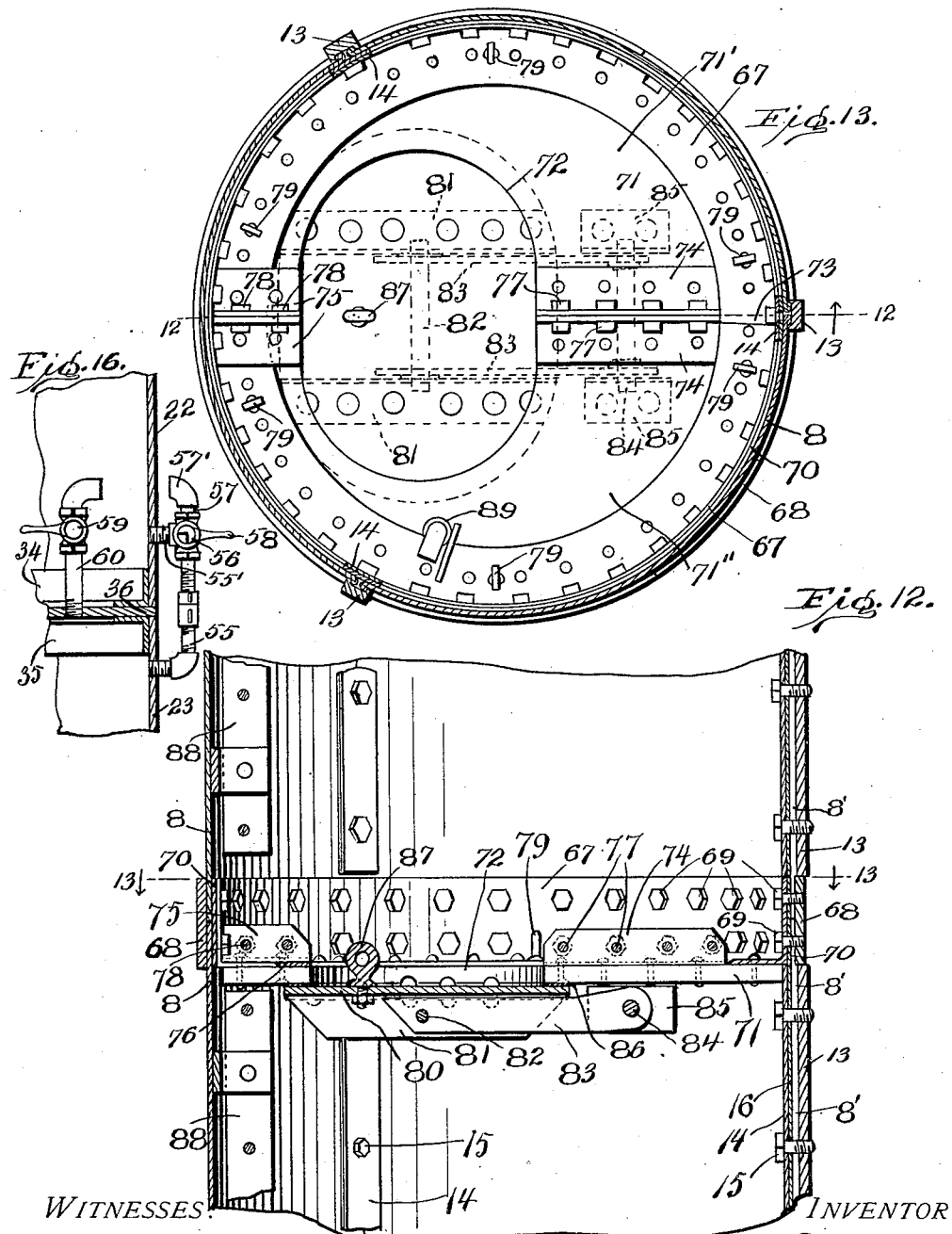

O. C. EDWARDS, Jr.
CAISSON.
APPLICATION FILED MAY 29, 1908.
1,023,825.
Patented Apr. 23, 1912.
7 SHEETS—SHEET 7.
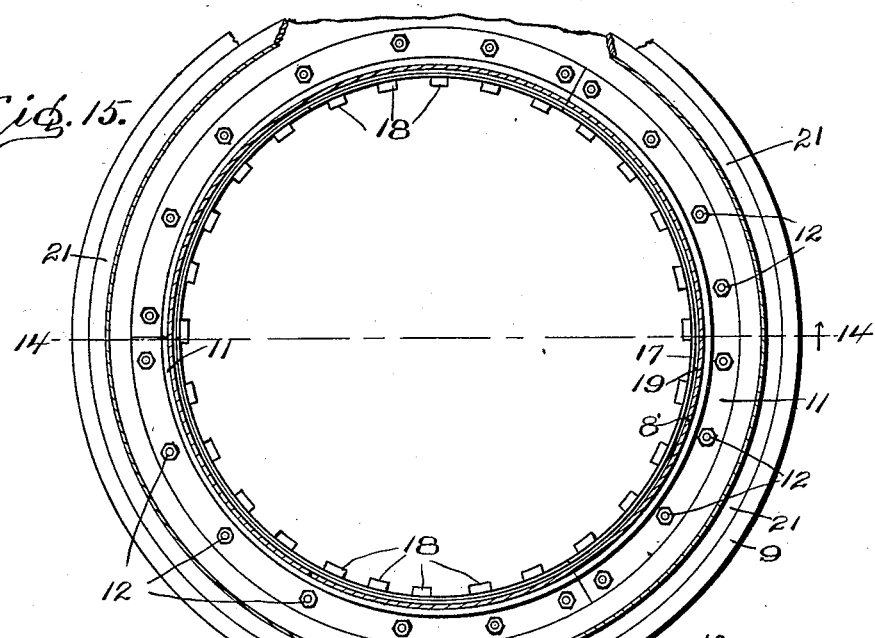
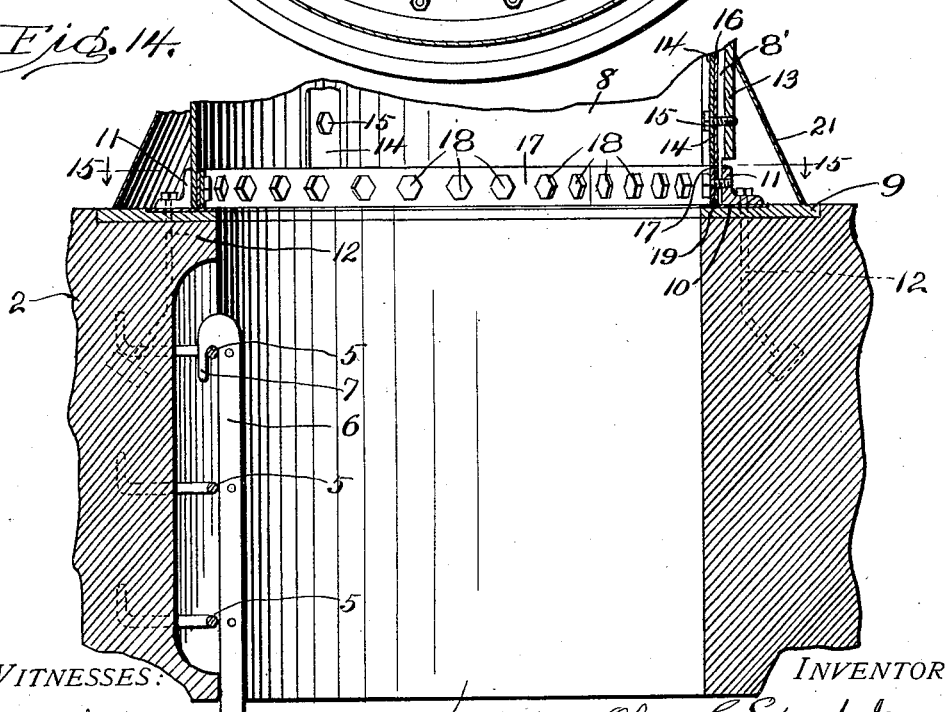
WITNESSES:
C. H. Fesler
Durant Church
INVENTOR
Oliver C. Edwards, Jr.
BY
Edgar M. Kitchin,
his Attorney.

UNITED STATES PATENT OFFICE.

OLIVER CROMWELL EDWARDS, JR., OF TROY, NEW YORK.

CAISSON.

1,023,825.

Specification of Letters Patent.

Patented Apr. 23, 1912.

Application filed May 29, 1908. Serial No. 435,776.

*To all whom it may concern:*

Be it known that I, OLIVER C. EDWARDS, Jr., C. E., a citizen of the United States, residing at Troy, in the county of Rensselaer and State of New York, have invented certain new and useful Improvements in Caissons; and I do hereby declare the following to be a full, clear, and exact description of the invention, such as will enable others skilled in the art to which it appertains to make and use the same.

This invention comprehends certain improvements in caissons, and has particular reference to the air locks and shafts thereof and attachments therefor.

One of the objects in view is the facilitating of manipulation of the lock doors by an exteriorly positioned tender, and a further object is the shortening of the long lock section for preventing waste of compressed air when decompressing the caisson gang.

With these and further objects in view, the invention comprises certain novel constructions, combinations and arrangements of parts as will be hereinafter fully described and claimed.

In the accompanying drawings:—Figure 1 is a vertical section through an air shaft and fragment of caisson embodying the features of the present invention. Fig. 2 is a top plan view of the air shaft. Fig. 3 is a view in front elevation of the upper section of the air lock detached. Fig. 4 is a longitudinal, vertical, central section taken therethrough on the plane indicated by line 4, 4 of Figs. 2 and 3, and looking in the direction indicated by the arrow. Fig. 5 is a horizontal section taken on the plane indicated by line 5, 5 of Fig. 4, and looking downwardly. Fig. 6 is a detail, vertical section of a fragment of the central portion of the head plate of the upper lock section showing the pivotal connection for the door in section. Fig. 7 is a top plan view of the parts seen in Fig. 6. Fig. 8 is a vertical, central section through the lower lock section and the connected parts of the upper lock section and the upper end of the air shaft proper, the section being taken on the plane indicated by line 8, 8 of Fig. 9. Fig. 9 is a horizontal section taken on the plane indicated by line 9, 9 of Fig. 8, and looking downwardly. Fig. 10 is a detail, horizontal section taken through one of the bearings of the shaft for the lower lock door, a fragment of the shaft being seen in section, the section being taken on the plane indicated by line 10, 10 of Fig. 11, and looking downwardly. Fig. 11 is a transverse, vertical section taken on the plane indicated by line 11, 11 of Fig. 10, and looking in the direction indicated by the arrow. Fig. 12 is a vertical, central section through a fragment of the air shaft, the section being taken through the adjustable diaphragm, and being taken on the plane indicated by line 12, 12 of Fig. 13, looking in the direction indicated by the arrow. Fig. 13 is a horizontal section taken on the plane indicated by line 13, 13 of Fig. 12 and looking downwardly. Fig. 14 is a vertical section taken on the plane indicated by line 14, 14 of Fig. 15, and looking in the direction indicated by the arrow, a fragment of the caisson roof being shown in section. Fig. 15 is a horizontal section taken on the plane indicated by line 15, 15 of Fig. 14, and looking downwardly. Fig. 16 is a detailed sectional view showing the air pressure equalizing and relief valves.

Referring to the drawings by numerals, 1 indicates any suitable caisson provided with the usual roof 2, which is apertured, as at 3, for forming a passage to the working chamber of the caisson 1. The roof 2 is recessed at one side of the passage 3, as at 4, and ladder rounds 5, 5 are arranged in the recess, and each preferably consists of a rod having its ends bent at right angles to the intermediate portion and embedded in the roof 2, the terminals of the end portions being preferably bent so as to be firmly anchored in the roof. The roof may be of any suitable masonry as concrete.

To facilitate descent into the working chamber of caisson 1, a suitable ladder 6 is provided and formed at its ends with hooks 7 adapted to be caught over any one of the rounds 5 for sustaining the ladder in position.

Mounted on the roof 2 in alinement with the passage 3 is the air shaft 8. In order to make a good air tight joint between the shaft 8 and the roof 2, the upper surface of the roof, as best seen in Fig. 14, is preferably recessed about the passage 3, and the recess is filled with a layer of mortar 9 in which is embedded a gasket 10, preferably of rubber, said gasket extending about the recess, and upon the said gasket rests the lower end of the shaft 8, the shaft being detachably connected with the roof by being bolted to an angle bar ring 11 resting with its horizontal flange upon the gasket 10, the said flange being anchored to the roof 2 by bolts 12, 12 embedded in said roof and detachably engaging said flange, the said ring being preferably formed of segments, as hereinafter specified.

The shaft 8 may consist of one or a number of shaft sections superimposed and alined with respect to each other and having their ends detachably connected, each of said sections being a duplicate of the other, and each consisting of a plurality of vertically disposed shell segments 8', the longitudinal edges of contiguous segments being bent back upon the respective segments for forming longitudinal beads or shoulders engaged and inclosed by a splicing plate 13, one plate 13 being provided for each joint between contiguous segments 8', as clearly seen in Fig. 13. Each plate 13 is arranged on the outside of the shaft, and a corresponding splice plate 14 is arranged on the inside of the shaft for each plate 13, bolts 15 being passed through each plate 14 and threaded into the respective plate 13, a suitable strip of packing 16 being arranged between the respective plate 14 and the inner faces of the contiguous segments for preventing air leakage along the joint or line of juncture of each two meeting edges of shell segments. The detail construction of the joint produced by the said splicing plates and contiguous parts is fully developed in my co-pending application filed even date herewith and designated by Serial No. 435,775, and therefore no attempt is here made at setting forth the same minutely. At the ends of each shaft section, the bent back portions or shoulders on the edges of the segments are cut away, and the horizontal joint between the contiguous sections is sealed against leakage by an exterior band and an interior band detachably bolted together by bolts passing through the walls of the segments and engaging the respective bands, a suitable annular gasket being interposed between the inner band and the inner face of the segments, this feature of construction however, being fully set forth in detail in my companion application above referred to and filed even date herewith. The joints at the upper and lower ends of the entire air shaft are specially constructed, as will be hereinafter described, and one of the intermediate joints, as for instance the joint between the lower end of the uppermost shaft section and the upper end of the next lower shaft section may have a detail construction differing from the usual joints between shaft sections as seen in Fig. 12, and as will be hereinafter fully set forth.

The lower end of the air shaft 8 which rests upon the gasket 10 is engaged by the angle plate 11, as above set forth, and the vertical flange of said angle plate serves as the outside splicing ring, a complemental splicing ring 17 being arranged within the shaft opposite the vertical flange of angle bar 11 and connected therewith by bolts 18, 18 passed through the splicing ring 17 through the walls of the shaft and threaded into the vertical flange of angle plate 11. A packing gasket 19 is interposed between plate 17 and the inner face of the walls of shaft 8. The splicing ring 17 is preferably made up of segments like angle bar 11 and correspondingly arranged, the meeting ends of the segments of both plate 11 and ring 17 being disposed for breaking joints with the contacting edges of the segments 8'. The formation of the plate 11 and the ring 17 in segments facilitates assembling dismantling, packing and shipment of the parts.

In the sinking of a caisson, it becomes desirable to fill the coffer dam or superstructure with concrete or other masonry, as indicated at 20 in Fig. 1, and in order to prevent such masonry interfering with the detachment of the angle plate 11, a guard plate or shield 21 of frusto-conical form is arranged at the lower end of the shaft 8 and fits at its upper end snugly about the shaft and rests at its lower edge or end upon the roof 2, so that in filling concrete about the shaft an annular space will be left about the lower end of the shaft enabling and facilitating access to and removal of the parts.

On the upper end of the air shaft 8 is mounted the air lock consisting of the upper air lock section 22 and the lower air lock section 23. The upper air lock section 22 is preferably formed cylindrical, and is provided at its lower end with a track rail 24 supported by suitable bolts 25, 25 extending through the walls of the section 22. The section 22 is formed with a doorway adapted to be closed by a door 26 which is slidingly mounted upon the rail 24 and preferably supported thereon by anti-friction rollers 27, 27. The detail arrangement of the rail 24 and the rollers 27 is fully disclosed in my above mentioned co-pending application, and is therefore not herein set forth in detail. The upper end of the door 26 is held in place and guided in its movement by a pivot plate 28, which is secured to the upper end of the door by a suitably arranged bracket 29 fixed to the outer end of the plate 28 and to the upper end of the door 26. The inner end of the plate 28 is engaged by a bolt 30 which is pivotally passed through a bracket plate 31 fixed to the head or upper end of the section 22. In order to prevent displacement of the plate 28 and to facilitate guiding the same in its movement, the plate is preferably disposed between the lower face of the head or section 22 and the free end of the bracket 31. Thus when the door 26 is moved it will slide upon the rail 24 and have its upper end guided in a circular path by the plate 28 and its connections. In order to facilitate manual manipulation of the door 26, a suitable hand hold 32 is provided therein, as fully disclosed in detail in my above mentioned co-pending application, and as also fully disclosed in detail in said co-pending application, and an inspection aperture 33 is provided in the wall of section 22 and closed against the escape of air by a suitable transparent plate.

An annular angle plate 34 is fixed to the lower end of the section 22, and to the upper end of the section 23 is fixed a similar plate 35, a diaphragm plate 36 being interposed between the angle plates 34 and 35, and the horizontal flanges of plates 34 and 35 being connected by detachable bolts 37, 37 passed through said flanges and through the interposed plate 36. The plate 36 is, of course, of the same diameter as lock sections 22 and 23 and serves as a separating partition between the two, a man hole or opening 38 being formed in the plate 36 for permitting persons to pass from one lock section to the other. The annular wall of the section 23 is preferably formed of a strip of material bent into annular form and having the vertical meeting edges retained in position by a splice plate 39, which overlaps said meeting edges on both sides, and is suitably riveted or otherwise rigidly secured to the material of the wall of section 23.

Cemented or otherwise suitably secured to the under face of plate 36 is a gasket 40 which surrounds the aperture 38 and is adapted to be engaged by the lower section door 41 for enabling the exhaust of pressure from the upper lock section without relieving the working chamber pressure. The door 41 consists of a flat plate to which is riveted or otherwise suitably secured parallel angle plates 42, 42, a shaft 43 extending through the vertical depending flanges of the angle plates 42. Pivotally engaging the shaft 43 are supporting arms 44 for the door 41. Obviously the arms 44 may be fixed to shaft 43, and the shaft journaled in its bearings in the plates 42, instead of the pivotal connection of the arms 44 with the shaft 43. The arms 44 extend from shaft 43 to and are keyed or otherwise fixed on a shaft 45. The shaft 45 at its ends is journaled in and preferably extends through the walls of section 23, and either of the extended ends of shaft 45 is adapted to receive an operating lever 46 which is of sufficient length to readily enable manual manipulation of the door 41 by the rocking of shaft 45. The door 41 is, of course, designed to be swung downwardly from its closed position to a position out of line with the opening 38, and when being swung to its closed position is adapted to have a certain amount of pivotal movement on the shafts 43 by reason of the fact that the flattened portions 44' at the free ends of arms 44 are spaced a short distance from the under face of the plate of door 41, so that said door may rock a short distance on its shaft 43 before striking the flattened portions 44'. Thus when the door 41 is brought to its seat, the upward pressure of the arms 44 will tend to cause the door to rock slightly if any unevenness occurs in the seat, so as to insure a firm tight seating of the door for preventing air leakage.

Each end of the shaft 45 is provided with a suitable journal bearing and gland for preventing the escape of air, as indicated in dotted line in Fig. 9, one of said bearings being seen in full lines in Fig. 8 and in detail in Figs. 10 and 11. As these bearings are exact duplicates, one only will be described in detail. Each of said glands and journal bearings consists of a bearing plate 46' riveted or otherwise suitably secured to the wall of the section 23 and having a filler plate or packing 47 interposed between the inner face of said wall and the outer face of said plate, the outer face of the plate 46' being curved to conform to the curvature of the wall, and the inner face being flat and lying in a plane at right angles to the longitudinal axis of the shaft 45, the filler plate 47 serving to compensate for the thickness of the vertical flange of angle plate 35 as indicated in Figs. 8, 10 and 11. A gland box plate 48 is arranged with its outer face contacting with the inner face of plate 46 and is preferably retained in position by the same rivets which retain plate 47, said rivets being passed through both of said plates. The plates 46 and 48 are bored for receiving the shaft 45, and a preferably bronze bushing 49 surrounds the shaft 45 within the bore of said plates, and the inner end of said bushing is flanged, as at 50, the flange being seated in an enlarged annular recess in plate 48 and having its inner face engaged by a gasket or other packing 51 surrounding the shaft 45. The plate 48 is formed with an inwardly extending annular boss 52 which is exteriorly threaded and is spaced from the shaft 45 for forming an annular space continuous of the recess occupied by flange 50. A nut 53 is mounted on the shaft 45 and formed with an annular recess 54 positioned and adapted for receiving the boss 52, the outer wall of the recess 54 being threaded to intermesh with the exterior threads of the boss 52, and an outwardly extending boss 54′ being left by recess 54 on the nut 53 adapted to fit snugly in the annular space between the boss 52 and the shaft 45 and designed to engage the gasket or packing 51 for firmly retaining the parts in position.

In order to enable manipulation of the door 26, owing to the bursting pressure on the door, it is necessary to exhaust the pressure from the upper section 22, and to enable manipulation of the door 41 it is necessary to equalize the pressure between the interior of the shaft and the interior of the section 22, and in order to facilitate the control of the exhausting of pressure, as well as the equalization of pressure both from the inside of section 22 as well as from the outside, I arrange tubes with their controlling valves, as indicated in Fig. 16, in which 55 is a tube leading from the section 23 and extending outside the lock and communicating with a three-way valve 56, the ways or passages thereof being arranged at substantially right angles and meeting within the body of the valve, said valve having an exhaust nozzle 57 connecting elbow 57′ to prevent exhaust air from blowing in the face of the lock tender, and an operating handle 58. The valve 56 in turn communicates by means of tubes 55′ with the upper lock section 22. In operation, when it is desired to open the door 26, the door 41 will be closed and the operator will turn the handle 58 for shutting off communication of tube 55 with tube 55′, the passages of the valve being moved to register respectively with the tube 55′ and exhaust 57, whereby the excess pressure in the upper section 22 will be exhausted through tube 55′. When it is desired to open the door 41, the door 26 is closed and the handle 58 is turned to the position indicated in Fig. 16 for cutting off the exhaust 57 and establishing communication between tubes 55 and 55′ which permits the exhausting of pressure from the air shaft into the section 22, and as soon as the pressure in said section is substantially equal to that in the air shaft, the door 41 may be opened. In order to obviate liability of accidents from lack of pressure in the section 22, an air cock 59 is provided communicating by pipe 60 through plate 36 with the section 23, so that pressure may be drawn from the air shaft by a person within the section 22 when desired.

To the lower end of the lower lock section 23 is fixed an annular angle plate 61 having its horizontal flange extending inwardly and resting upon the horizontal flange of an annular angle plate 62. The plates 61 and 62 are detachably secured together by bolts 66 passed through the horizontal flanges of said plates. The angle plate 62 surrounds the upper end of the uppermost section of the air shaft and serves as the outer circular splicing plate, a complemental inner splicing plate, as 63, being arranged within the upper end of the air shaft and being secured in place by bolts 64, 64 passed through plate 63 and through the wall of the air shaft and threaded into the depending vertical flange of the plate 62. A packing gasket 65 is interposed between the plate 63 and the inner face of the walls of the air shaft.

It is to be noted that by the use of the detachable bolts 37 and 66 the upper lock section may be disconnected from the lower lock section, and the lower lock section disconnected from the air shaft for facilitating transportation.

Preferably at the juncture of the lower end of the uppermost air shaft section 8 with the upper end of the next lower shaft section is arranged a diaphragm which is made adjustable, so as to be adapted to be moved upwardly with the addition of each new shaft section, so as to maintain such diaphragm in the same relative position with respect to the air lock sections, regardless of the length of the air shaft. This diaphragm is illustrated in detail in Figs. 12 and 13, in which 67 indicates an annular angle plate having a relatively wide vertical flange adapted to take the place of the usual inner annular splicing plate. An outer band splicing plate 68 surrounds the contacting ends of the shaft sections and lies between the ends of the splicing plates 13 of the respective shaft sections. Band 68 is formed of a plurality of segments as seen in Fig. 13, each extending from a point midway between the two splicing plates 13 to a point midway between one of such splicing plates and the next succeeding splicing plate so that the joints of the band 68 are staggered and out of line with the vertical seams or joints of the segments 8′. This construction of the plate or band 68 facilitates packing for shipment, and obviously the bolt holes may be correspondingly spaced in each section of the band so that the several sections will be interchangeable, which will greatly facilitate assemblage of the parts. The splice plate 68 is exactly the same as the outer band splice plate at the juncture of any two shaft sections. The plate 68 is secured to the plate 67 by detachable bolts 69 passed outwardly through the plate 67 and through the walls of the shaft sections and threaded into the plate 68. A row or set of the bolts 69 is preferably arranged above the lower edge of the upper shaft section, and a similar set or row of said bolts is arranged below the upper edge of the lower shaft section, and a packing gasket 70 is arranged between the plate 67 and the inner face of the shaft sections. The angle plate 67 is divided into two sections which are substantially semi-circular, one of the sections however being a little in excess of a semi-circle, and the other section correspondingly less than a semi-circle, and to the horizontal flange of the plate 67 is secured a diaphragm 71, which is formed with a passage or opening 72 and which is divided into sections 71' and 71''. As clearly indicated in Fig. 13, the horizontal flange of plate 67 of that section of the plate which is greater than a semi-circle overlaps the line of jointure of the sections 71' and 71'' of diaphragm 71, as indicated at 73, so as to prevent the blowing out of packing arranged between the contiguous edges of the sections 71' and 71'', whereby leakage past the diaphragm is obviated. The sections 71' and 71'' are riveted or otherwise secured to the horizontal flange of the respective sections of angle plate 67 and the sections 71' and 71'' are secured together by transversely arranged angle plates 74, 74 extending along the line of jointure of said sections 71' and 71'' inside the horizontal flange of angle plate 67, and at one side of the aperture 72. At the other side of the aperture similar angle plates 75 are similarly arranged, except that the plates 75 rest upon the horizontal flange of plate 67 and a filler plate 76 is arranged between the diaphragm 71 and the plates 75 inside the horizontal flange of plate 67. The plates 74 and 75 have their horizontal flanges riveted or otherwise suitably secured to their respective sections of diaphragm 71, and the vertical flanges of plates 74 are detachably secured together by bolts 77, 77, and the vertical flanges of plates 75 are similarly detachably connected by bolts 78, 78. The sections 71' and 71'' of the diaphragm are thus detachably connected together, and may be readily adjusted to position in the air shaft, and in order to facilitate positioning of the diaphragm, I have provided ring bolts 79, 79 which may be engaged by suitable cables extending upwardly in the air shaft and passed about shaft 45, or any other suitable supporting element above the diaphragm. Obviously, any well known form of block and fall may be employed for elevating the diaphragm when it is desired to adjust the same to a new position, and it is further obvious that the diaphragm may be positioned at other points along the length of the shaft sections than at the ends, although the arrangement at the ends as indicated is preferred, as it not only obviates the necessity for a break in the vertical splicing plates, but also effects a saving of one of the otherwise necessary and regular splicing bands.

The opening 72 is adapted to be closed by a door 80 having parallel angle plates 81 in which is mounted a cross shaft 82 engaged by supporting arms 83. The arms 83 in turn are pivotally supported by a shaft 84 journaled in depending bracket plates 85 fixed to the respective sections of the diaphragm 71. A gasket 86 is cemented or otherwise suitably secured to the diaphragm 71 about the opening 72 for producing a tight joint between the door 80 and the diaphragm, the gasket being formed in two pieces to correspond with the sections of the diaphragm. A ring bolt 87 is fixed to the door 80 and is adapted to be engaged by a rope or cable for facilitating drawing the door to a closed position, and the cable may be tied to the round of a ladder 88 which extends along the length of the air shaft and is arranged in sections corresponding to the shaft sections 8 and detachably connected therewith as fully set forth in my above mentioned copending application.

It is obvious that the adjustability of the diaphragm 71 is a great advantage in caisson work, as the usual door arranged at or near the lower end of the air shaft necessitates employing the entire air shaft as the "long lock" of the air lock, and this long lock increases in length as the caisson descends and additional sections are applied to the air shaft. In the decompressing or the compressing of an entire caisson gang, it is necessary to prevent delay to utilize the long lock so that all the members of the gang may ascend or descend at the same time, and thus the enormous waste of compressed air occurring in the old forms of doors at the lower end of the air shaft is prevented by the present improved adjustable diaphragm. Obviously the door 80 will be useful also when the air lock at the upper end of the air shaft is removed for permitting the positioning of a new shaft section, and after the new shaft section has been positioned and the air lock returned to its place, the bolts 69, 77 and 78 may be removed and the diaphragm with its connected parts hoisted to a new position and again assembled.

Of course, a regular splicing band could be bolted to the diaphragm 71 in lieu of the angle plate 67, or plate 67 may be considered a regular splicing band so connected.

In order to enable admission of compressed air from the working chamber and main portion of the air shaft into the "long lock" above diaphragm 71, an air cock 89 is provided and connected with a tube extending from above the diaphragm down through the diaphragm.

While I have shown the above described collapsible air shaft and improved air lock as being used in connection with pneumatic caissons, the invention made manifest herein may be utilized in structures similar to those disclosed and adapted for the construction of tunnel shafts and for other construction purposes, without departing from the spirit of the invention and within the scope of the appended claims.

What I claim is:—

1. In an air lock, the combination with an upper lock section having a door-way, of a door slidingly mounted for closing said door-way, a bracket fixed to the lock section, and a pivotal connection between the door and said bracket for guiding the door in its sliding movement.

2. In combination, an air lock section having an imperforate top, a guide plate pivotally connected thereto, and a slidingly mounted door connected with said plate for being guided in its sliding movement.

3. In combination, an air lock section, a bracket depending therein, a door slidingly mounted in said section, and guiding means for the door connected to the door and pivotally connected to said bracket.

4. In combination, an air lock section, a vertically arranged door mounted to slide horizontally, a bracket depending from the top of the section, and means pivotally connecting the door with said bracket for guiding the door in its sliding movement.

5. In combination, upper and lower air lock sections, a diaphragm plate therebetween formed with a passage opening, a door for closing said opening, and an arm movably connected to the door for closing the same.

6. In combination, an air lock section, a diaphragm plate having a passage opening, a door for closing said opening, an arm for operating the door pivotally connected to the door and provided with means for limiting the pivotal movement of the door with respect to the arm.

7. In combination, an air lock section diaphragm plate formed with a passage opening, a bodily movable door for closing the same, a shaft connected with the door, and a movably mounted arm carrying said shaft and adapted to move the door for closing and opening the same when the arm is moved, the connection between the door and arm being pivotal.

8. In combination, an air lock section diaphragm plate having a passage opening, a door for closing the same, and an arm pivotally connected to said door and having a flattened portion lying substantially parallel to one of the faces of the door and spaced a comparatively short distance therefrom.

9. In combination, an air lock section, a diaphragm plate therefor, having a passage opening, a door for closing said opening, a shaft journaled in the walls of the section, parallel angle plates fixed to the door and having depending flanges, a shaft extending through said depending flanges, and parallel arms fixed to the first mentioned shaft and engaging the second mentioned shaft contiguous to the respective depending flanges.

10. In combination, upper and lower air lock sections, means outside the sections for equalizing the pressure in the upper section with that in the lower section, or with the atmosphere, and means within the upper section for equalizing the pressure in the upper section with that in the lower section.

11. In combination, an air shaft, a diaphragm adjustable longitudinally thereof and formed with a passage opening, and a door for closing said opening.

12. In combination, an air shaft, an adjustable diaphragm therein, comprised of detachably connected sections and formed with a passage opening, and a door for closing said opening.

13. In combination, an air shaft and an adjustable diaphragm therein comprising a diaphragm plate divided into sections, flanged plates connected to said sections, and means detachably connecting the flanges of said flanged plates, the diaphragm being formed with a passage opening, and a door pivotally connected to the diaphragm in position for being swung to and from a position closing said opening.

14. In combination, an air shaft, an angle plate extending about the inner face of the shaft and having its horizontal flange extending inwardly, said plate being formed in sections, a diaphragm plate fixed to the first mentioned plate and correspondingly formed into sections, means detachably connecting the sections of the diaphragm plate, the line of jointure of the diaphragm sections being out of line with one of the lines of jointure of the sections of the angle plate for causing the horizontal flange of the angle plate to lap the line of jointure of the diaphragm sections, the diaphragm plate being formed with a passage opening, and a door for closing said opening.

15. In combination, an air shaft, an angle plate extending about the inner face of the walls of said shaft and fixed to said walls, and formed into sections, a diaphragm plate snugly fitting across and closing said air shaft and extending contiguous to one of the flanges of the angle plate, said flange and plate being secured together, and the line of jointure of the sections of said diaphragm plate being out of line with one of the lines of jointure of the angle plate, an angle plate fixed to each of the diaphragm sections and extending along the line of jointure thereof, means detachably connecting the free flanges of said last mentioned angle plates, the said diaphragm plate being formed with a passage opening, and a door for closing said opening.

16. In combination, an air shaft, an adjustable diaphragm therein having a passage opening, a swinging door for closing the same pivoted beneath the diaphragm, and a ring bolt engaging the door and extending upwardly from the upper face thereof and adapted to receive a supporting cable for the door.

17. In combination, a sectional air shaft having an exterior splicing band at each juncture of two sections, an angle plate band having one of its flanges arranged for comprising a splicing band, a diaphragm connected to said plate and formed with a passage opening, and a door for said opening.

18. In an air shaft, the combination of a plurality of shaft sections arranged end to end and provided with detachably arranged splicing bands extending across the lines of jointure of the meeting ends of the sections, a laterally extending flange projecting from one of said splicing bands, a diaphragm fixed to said flange, and formed with a passage opening, and a door for closing said opening.

19. In an air shaft, the combination of a plurality of shaft sections arranged end to end and provided with detachably arranged splicing bands extending across the lines of jointure of the meeting ends of the sections, a diaphragm connected to one of said bands and formed with a passage opening, and a door for said opening.

20. In an air shaft, the combination of a plurality of shaft sections arranged end to end, an internally arranged splicing band extending across the line of jointure of the meeting ends of each two contiguous sections, a diaphragm adjustable longitudinally of the air shaft and connected to one of said bands and formed with a passage opening, and a door for closing said opening.

21. In an air shaft, the combination of a plurality of shaft sections arranged end to end, an internally arranged splicing band extending across the line of jointure of the meeting ends of each two contiguous sections, a collapsible diaphragm adjustable longitudinally of the air shaft and connected to one of said bands and formed with a passage opening, and a door for said opening.

22. In a caisson, the combination with a caisson roof having a passage opening, of an air shaft mounted upon the roof and surrounding said opening, means exterior of the shaft for detachably securing the shaft to the roof, and a guard for said securing means.

23. In a caisson, the combination with a caisson roof having a passage opening, of a shaft mounted on the roof and surrounding said opening, an exteriorly arranged angle plate surrounding the lower end of the shaft, and means detachably connecting said shaft with said plate.

24. In a caisson, the combination with a caisson roof having a passage opening, of an air shaft resting upon said roof and surrounding said opening, an externally arranged annular plate surrounding the lower end of the air shaft, means connecting the plate to the shaft, means detachably connecting the plate to the roof, and a guard for said plate and attaching means.

25. In a caisson, the combination with a roof having a passage opening, of a shaft mounted on the roof and surrounding the opening and comprised of longitudinal segments, a plate surrounding the lower end of the shaft and comprised of segments arranged to break joints with the segments of the shaft, means connecting the plate to the shaft, and means connecting the plate to the roof, one of said connecting means being detachable.

26. In a caisson, the combination with a caisson roof having a passage opening, an air shaft mounted on the roof and surrounding the opening, comprising longitudinal segments, a band plate arranged interiorly of the lower end of the shaft and extending about the wall thereof, a plate arranged exteriorly of the lower end of the shaft and surrounding the same, means connecting said plates together, and means connecting the last mentioned plate to the roof, one of said connecting means being detachable.

27. In a caisson, the combination with a caisson roof having a passage opening, of an air shaft mounted on the roof and surrounding said opening, means arranged exteriorly of the shaft for connecting the shaft to the roof, and a shield plate surrounding the shaft and arranged above said connecting means.

28. In a caisson, the combination with a caisson roof having a passage opening, of an air shaft mounted on the roof and surrounding said opening, means arranged exteriorly of the shaft for connecting the shaft to the roof, and a guard plate mounted on the roof and extending to and surrounding the shaft and inclosing the said connecting means.

29. In a caisson, the combination with a masonry roof having a passage opening, and a recess formed in the masonry of the roof at one side of said opening, of a rod arranged within said recess and partially embedded in the masonry of the roof for forming a ladder round within the recess.

30. In a caisson, the combination with a masonry roof having a passage opening and formed with a recess in the masonry of the roof at one side of the opening, of a plurality of rods disposed transversely with respect to the vertical axis of the opening and arranged within the recess and having their ends embedded in the masonry of the roof for forming ladder rounds.

31. In a caisson, the combination with a masonry roof having a passage opening and a recess formed in the masonry of the roof at one side of the opening, of a rod embedded in the masonry of the roof and extending into said recess for constituting a ladder round, and a ladder formed with a hooked end engaging said round.

32. In a caisson, the combination of shaft sections disposed in end-wise alinement and each comprising separable segments, a splice plate engaging the segments for preventing separation thereof, and a splicing band surrounding the contiguous end of the shaft sections, said band being formed of separable sections.

33. In a caisson, the combination of shaft sections disposed in end-wise alinement and each comprising separable segments, a splice plate engaging the segments for preventing separation thereof, and a splicing band surrounding the contiguous end of the shaft sections, said band being formed of separable sections and arranged with the ends of the sections out of alinement with the meeting edges of the shaft segments.

34. In a caisson, the combination of shaft sections disposed in end-wise relation and each comprising separable shaft sections, splicing plates engaging the same for preventing separation of the segments, and a splicing band surrounding said shaft sections at the line of jointure therebetween and formed of segments, each of said band segments being connected to a plurality of the shaft segments on each shaft section.

35. In a caisson, the combination of shaft sections disposed in end-wise relation and each comprising separable shaft segments and splicing bands engaging said segments for preventing separation thereof, an interior splicing band arranged at the line of jointure of the shaft sections, an exterior splicing band arranged about such line of jointure, each of said splicing bands being formed of a plurality of sections, and means connecting the splicing bands to the shaft sections.

In testimony whereof I affix my signature in presence of two witnesses.

OLIVER CROMWELL EDWARDS, JR.

Witnesses:
HENRY COLVIN,
J. S. HAWLEY.